US010462192B2

(12) United States Patent
Liang et al.

(10) Patent No.: US 10,462,192 B2
(45) Date of Patent: Oct. 29, 2019

(54) RADIO RESOURCE MANAGEMENT FOR PACKET-SWITCHED VOICE COMMUNICATION

(71) Applicant: Apple Inc., Cupertino, CA (US)

(72) Inventors: Huarui Liang, Beijing (CN); Tarik Tabet, Los Gatos, CA (US); Dawei Zhang, Saratoga, CA (US); Farouk Belghoul, Campbell, CA (US); Samy Khay-Ibbat, San Francisco, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 14/817,590

(22) Filed: Aug. 4, 2015

(65) Prior Publication Data

US 2016/0073299 A1 Mar. 10, 2016

Related U.S. Application Data

(60) Provisional application No. 62/048,619, filed on Sep. 10, 2014.

(51) Int. Cl.
*H04L 29/06* (2006.01)
*H04L 12/14* (2006.01)
(Continued)

(52) U.S. Cl.
CPC ...... *H04L 65/1016* (2013.01); *H04L 12/1407* (2013.01); *H04L 65/1069* (2013.01);
(Continued)

(58) Field of Classification Search
CPC combination set(s) only.
See application file for complete search history.

(56) References Cited

U.S. PATENT DOCUMENTS 8,483,182 B1 * 7/2013 Keller ............... H04W 36/0027
370/331
9,078,173 B2 7/2015 Liu et al.
(Continued)

FOREIGN PATENT DOCUMENTS

WO WO2013048189 A2 4/2013

OTHER PUBLICATIONS

International Search Report & Written Opinion, Application No. PCT/US2015/045588, dated Nov. 11, 2015, 11 pages.
(Continued)

*Primary Examiner* — Yee F Lam
(74) *Attorney, Agent, or Firm* — Meyertons Hood Kivlin Kowert and Goetzel PC; Jeffrey C. Hood; Michael B. Davis

(57) ABSTRACT

Techniques are disclosed relating to informing a network that a UE desires packet-switched voice communication. In one embodiment, a method includes receiving first information from a UE device requesting voice communication over a packet-switched network. In this embodiment, the method further includes transmitting, in response to the first information, second information to a base station serving the UE device, wherein the second information indicates that the UE device is requesting voice communication over the packet-switched network. In this embodiment, the transmitting is performed prior to establishment of a dedicated bearer by the base station for the UE device. In this embodiment, the second information operates to configure communications between the base station and the UE device to provide a particular quality of service for the packet-switched voice communication using the dedicated bearer.

12 Claims, 20 Drawing Sheets

(51) Int. Cl.
*H04W 28/24* (2009.01)
*H04W 76/12* (2018.01)
*H04W 4/24* (2018.01)
*H04M 15/00* (2006.01)

(52) U.S. Cl.
CPC ............ *H04L 65/80* (2013.01); *H04M 15/57* (2013.01); *H04M 15/63* (2013.01); *H04M 15/66* (2013.01); *H04W 4/24* (2013.01); *H04W 28/24* (2013.01); *H04W 76/12* (2018.02)

(56) References Cited

U.S. PATENT DOCUMENTS

| | | | |
|---|---|---|---|
| 9,473,976 B1* | 10/2016 | Singh | H04W 28/0268 |
| 2010/0034367 A1 | 2/2010 | Das et al. | |
| 2010/0128722 A1 | 5/2010 | Madour et al. | |
| 2012/0063300 A1* | 3/2012 | Sahin | H04W 36/12 |
| | | | 370/225 |
| 2012/0215930 A1* | 8/2012 | Stenfelt | H04L 12/1471 |
| | | | 709/228 |
| 2014/0219230 A1* | 8/2014 | Schierl | H04W 72/08 |
| | | | 370/329 |
| 2015/0131535 A1* | 5/2015 | Wallentin | H04W 76/025 |
| | | | 370/329 |
| 2015/0131619 A1 | 5/2015 | Zhu et al. | |
| 2015/0201454 A1* | 7/2015 | Shukair | H04W 76/045 |
| | | | 370/329 |
| 2016/0183156 A1* | 6/2016 | Chin | H04W 36/0022 |
| | | | 370/331 |
| 2016/0323846 A1* | 11/2016 | Park | H04W 4/08 |
| 2016/0338130 A1* | 11/2016 | Park | H04W 76/11 |

OTHER PUBLICATIONS

"3rd Generation Partnership Project; Technical Specification Group Services and System Aspects; Telecommunication management; Charging management; Study on inter-PLMN PS domain online charging", Release 13, Aug. 2014, 20 pages, Valbonne, France.
GSM Association, "IMS Profile for Voice and SMS", Version 7.0, Mar. 3, 2013, 32 pages.
"3rd Generation Partnership Project; Technical Specification Group Services and System Aspects; Policy and charging control architecture", Release 13, Jun. 2014, 220 pages, Valbonne, France.

* cited by examiner

| QCI | Resource Type | Priority | Packet Delay Budget | Packet Error Loss Rate | Example Services |
|---|---|---|---|---|---|
| 1 | GBR | 2 | 100ms | $10^{-2}$ | Conversational Voice |
| 2 | GBR | 4 | 150ms | $10^{-3}$ | Conversational Video (LiveStreaming) |
| 3 | GBR | 3 | 50ms | $10^{-3}$ | Real Time Gaming |
| 4 | GBR | 5 | 300ms | $10^{-6}$ | Non-Conversational Video (Buffered Streaming) |
| 5 | Non-GBR | 1 | 100ms | $10^{-6}$ | IMS Signaling |
| 6 | Non-GBR | 6 | 300ms | $10^{-6}$ | Video (Buffered Streaming) TCP-based (e.g., www, e-mail, chat, ftp, p2p file sharing, progressive video, etc.) |
| 7 | Non-GBR | 7 | 100ms | $10^{-3}$ | Voice, Video (Live Streaming) Interactive Gaming |
| 8 | Non-GBR | 8 | 300ms | $10^{-6}$ | Video (Buffered Streaming) TCP-based (e.g., www, e-mail, chat, ftp, p2p file sharing, progressive video, etc.) |
| 9 | Non-GBR | 9 | | | |

FIG. 6

| QCI | Resource Type | Priority | Packet Delay Budget | Packet Error Loss Rate | Example Services |
|---|---|---|---|---|---|
| 1 | GBR | 2 | 100ms | $10^{-2}$ | Conversational Voice |
| 2 | GBR | 4 | 150ms | $10^{-3}$ | Conversational Video (LiveStreaming) |
| 3 | GBR | 3 | 50ms | $10^{-3}$ | Real Time Gaming |
| 4 | GBR | 5 | 300ms | $10^{-6}$ | Non-Conversational Video (Buffered Streaming) |
| 5.1 | | 1 | 100ms | $10^{-6}$ | IMS Signaling for VoLTE |
| 5.2 | | n | | | IMS Signaling for other |
| 6 | Non-GBR | 6 | 300ms | $10^{-6}$ | Video (Buffered Streaming) TCP-based (e.g., www, e-mail, chat, ftp, p2p file sharing, progressive video, etc.) |
| 7 | Non-GBR | 7 | 100ms | $10^{-3}$ | Voice, Video (Live Streaming) Interactive Gaming |
| 8 | Non-GBR | 8 | 300ms | $10^{-6}$ | Video (Buffered Streaming) TCP-based (e.g., www, e-mail, chat, ftp, p2p file sharing, progressive video, etc.) |
| 9 | Non-GBR | 9 | | | |

FIG. 9

| Event Trigger | Description | Reported From | Condition for Reporting |
|---|---|---|---|
| VoLTE Inform | UE requests IMS signaling for VoLTE | PCRF | PCEF |

FIG. 17

Transmit, prior to establishment of a dedicated bearer by a base station for a UE, information requesting voice communication over a packet-switched network, where the first information operates to configure communications between the base station and the UE to provide a particular quality of service using the dedicated bearer
2110

Communicate with the base station using the dedicated bearer
2120

*FIG. 21*

Receive, prior to establishment of a dedicated bearer for communications with a user equipment (UE) device, information indicating that the UE device is requesting voice communication over a packet-switched network
2210

Configure one or more dedicated bearers for the UE device to provide a particular quality of service for the packet-switched voice communication based on the received information
2220

*FIG. 22*

RADIO RESOURCE MANAGEMENT FOR PACKET-SWITCHED VOICE COMMUNICATION

PRIORITY CLAIM

This application claims the benefit of U.S. Provisional Application No. 62/048,619, filed on Sep. 10, 2014, which is incorporated by reference herein in its entirety.

TECHNICAL FIELD

The present application relates to wireless cellular devices, and more particularly to techniques for informing a network that a device is requesting packet-switched voice communication.

DESCRIPTION OF THE RELATED ART

Wireless communication systems are rapidly growing in usage. Further, wireless communication technology has evolved from voice-only communications to also include the transmission of data, such as Internet and multimedia content.

As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

As one example, wireless technologies are increasingly using packet-switched connections for performing voice and video communication between users, e.g., using VoLTE (Voice over LTE (Long Term Evolution)) or video over LTE. Past technologies typically utilized circuit-switched networks for voice communications and packet-switched networks for data. Because of the addition of high priority voice data traffic on packet-switched networks, ensuring sufficient quality of service for these services is increasingly important.

In current methods for generating Quality of Service (QoS) information such as QoS class identifiers (QCI), there is no distinction in classification for different types of internet protocol multimedia subsystem (IMS) signaling. For example, some IMS signaling is for VoLTE, for which QoS is more important, and other IMS signaling is for other services (e.g., presence service), for which QoS is considered to be less important. In current systems, the network (NW) is configured to assign the same QCI value (QCI=5) for all IMS signaling. However, assigning the same QCI value for different types of IMS communication may be undesirable for several reasons. Further, current methods do not allow a base station to distinguish between VoLTE and other IMS signaling until after a dedicated bearer has already been established. Therefore, improvements are desired in wireless communication.

SUMMARY

Disclosed embodiments may relate to a system and method for informing a network that a UE is requesting packet-switched voice communication.

In one embodiment, a method includes receiving first information from a UE device requesting voice communication over a packet-switched network. In this embodiment, the method further includes transmitting, in response to the first information, second information to a base station serving the UE device, wherein the second information indicates that the UE device is requesting voice communication over the packet-switched network. In this embodiment, the transmitting is performed prior to establishment of a dedicated bearer by the base station for the UE device. In this embodiment, the second information operates to configure communications between the base station and the UE device to provide a particular quality of service for the packet-switched voice communication using the dedicated bearer.

In some embodiments, an MME is configured to receive the first information and may be configured to transmit the second information to the base station. In some embodiments, a PGW is configured to transmit the second information. In some embodiments, a PSCF is configured to transmit the second information. In some embodiments, a UE is configured to transmit the first information directly to the base station. In some embodiments, the second information includes a QCI value that indicates IMS signaling for VoLTE. In some embodiments, a PCC policy is used to indicate IMS signaling for VoLTE. In some embodiments, the base station is configured to implement a PCEF.

In one embodiment, a base station includes at least an antenna, a radio, and a processor. In this embodiment, the base station is configured to receive, prior to establishment of a dedicated bearer for IMS communications with a UE device, information indicating that the UE device is requesting voice communication over a packet-switched network. In this embodiment, the base station is configured to configure one or more dedicated bearers for the UE device to provide a particular quality of service for the packet-switched voice communication based on the received information. In some embodiments, the base station is configured to reduce congestion and/or schedule data on a radio access network based on the information. In some embodiments, the base station is configured to avoid deploying the packet-switched voice communication on unlicensed bands based on the information. In some embodiments, the base station is configured to deploy the voice communication using frequency division duplexing and not using time division duplexing based on the information. In various embodiments, this may improve performance of a radio access network.

In one embodiment, a UE device includes at least an antenna, a radio, and a processor. In this embodiment, the UE device is configured to transmit, prior to establishment of a dedicated bearer by a base station for the UE device, first information requesting voice communication over a packet-switched network. In this embodiment, the first information operates to configure communications between the base station and the UE to provide a particular quality of service for the packet-switched voice communication using the dedicated bearer.

BRIEF DESCRIPTION OF THE DRAWINGS

A better understanding of the disclosed embodiments may be obtained when considered in conjunction with the following drawings.

FIG. 6 is an example table illustrating characteristics of quality of service class identifiers, according to some embodiments;

FIG. 9 is a diagram illustrating one embodiment of an updated QCI table;

FIG. 17 is a table illustrating one embodiment of an event trigger;

FIG. 21 is a flow diagram illustrating another method for indicating to a base station that a UE is requesting VoLTE, according to some embodiments.

FIG. 22 is a flow diagram illustrating a method for handling an indication that a UE is requesting VoLTE, according to some embodiments.

Figure 1:
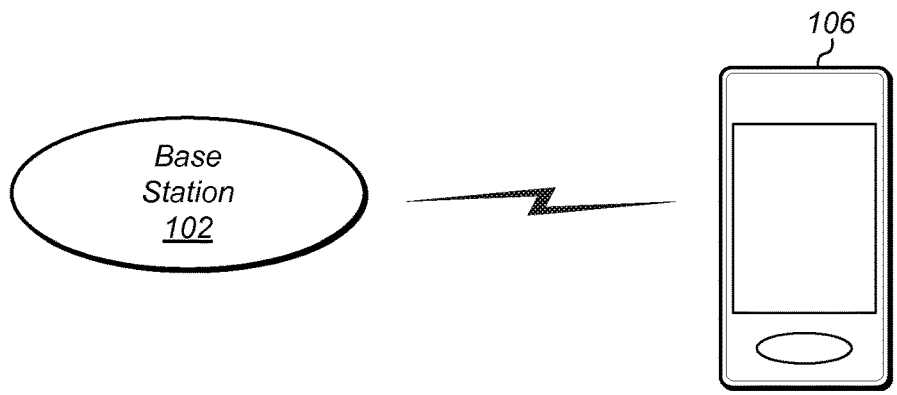
FIG. 1 illustrates an exemplary wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Figure 7:
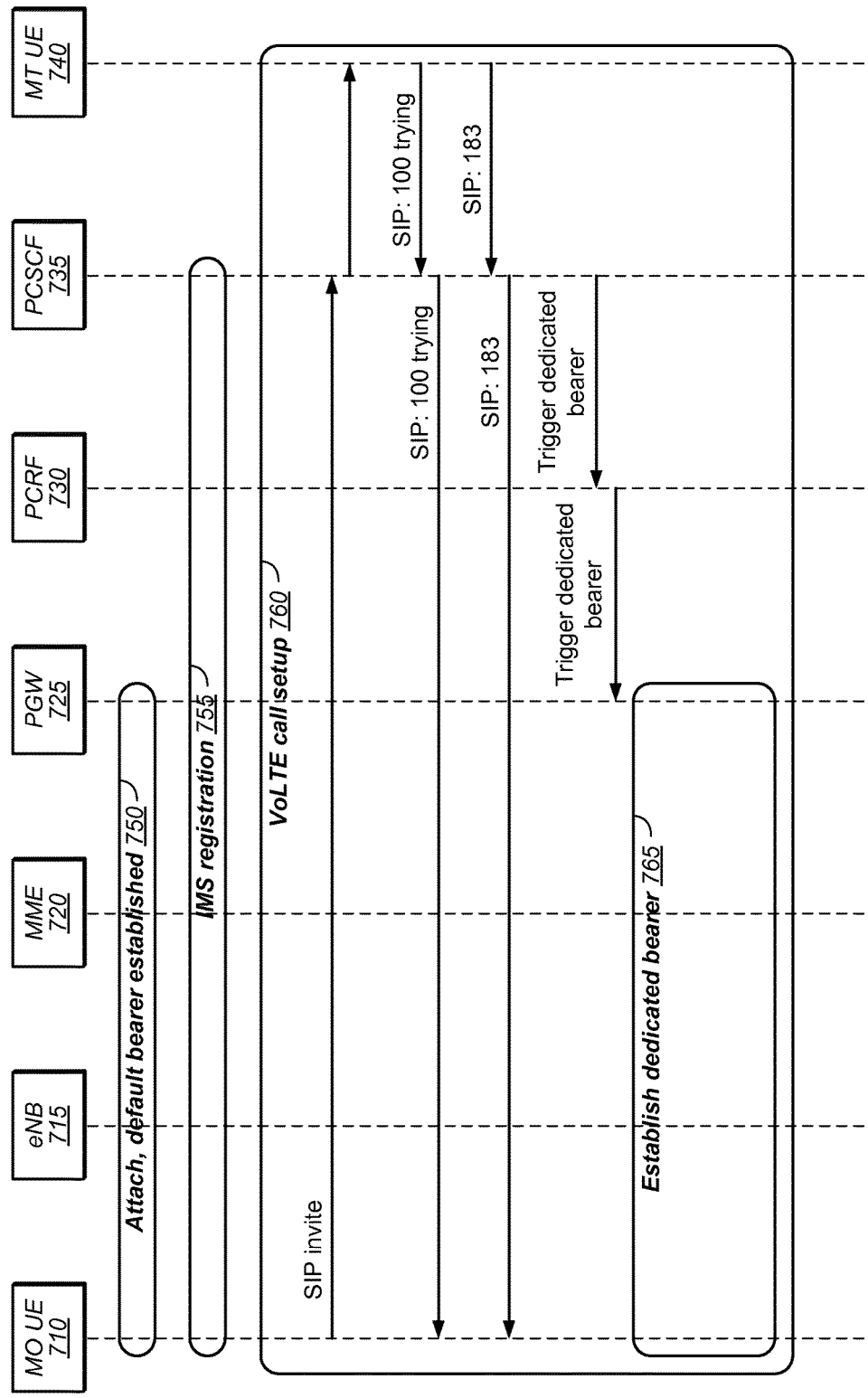
FIG. 7 is a communication diagram illustrating an exemplary VoLTE call setup procedure, according to some embodiments.

This disclosure initially describes, with reference to FIGS. 1-5, an overview of exemplary embodiments of a radio access network, UE device, and base station. FIG. 6 shows a QCI table while FIG. 9 shows one embodiment of an updated QCI table according to one embodiment. An exemplary VoLTE call setup is shown in FIG. 7, while FIGS. 8, 10-16, and 19 illustrate communication diagrams for embodiments of procedures in which a base station is notified that a UE desires packet-switched voice communication prior to establishment of a dedicated bearer (e.g., a dedicated IMS bearer). In some embodiments, these techniques may improve user plane bearer management, avoid network handover, and/or ensure a particular quality of service for the packet-switched voice communication.

Acronyms

The following acronyms are used in the present Provisional Patent Application:

3GPP: Third Generation Partnership Project
3GPP2: Third Generation Partnership Project 2
APN: Access Point Name
BLER: Block Error Rate (same as Packet Error Rate)
BER: Bit Error Rate
CRC: Cyclic Redundancy Check
DL: Downlink
GBR: Guaranteed Bit Rate
GSM: Global System for Mobile Communications
IMS: IP Multimedia Subsystem
IP: Internet Protocol
LTE: Long Term Evolution
MME: Mobility Management Entity
MO: Message Originating
MT: Message Terminating
NAS: Non-access Stratum
PCC: Policy and Charging Control
PCEF: Policy and Charging Enforcement Function
PCRF: Policy and Charging Rules Function
PCSCF: Proxy Call Session Control Function
PGW: Packet Gateway
PER: Packet Error Rate
QCI: Quality of Service Class Index
QoS: Quality of Service
RRC: Radio Resource Control
SGW: Serving Gateway
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System
VoLTE: Voice Over LTE Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect.

Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, wearable device, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), wearable devices (e.g., smart watch, smart glasses), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
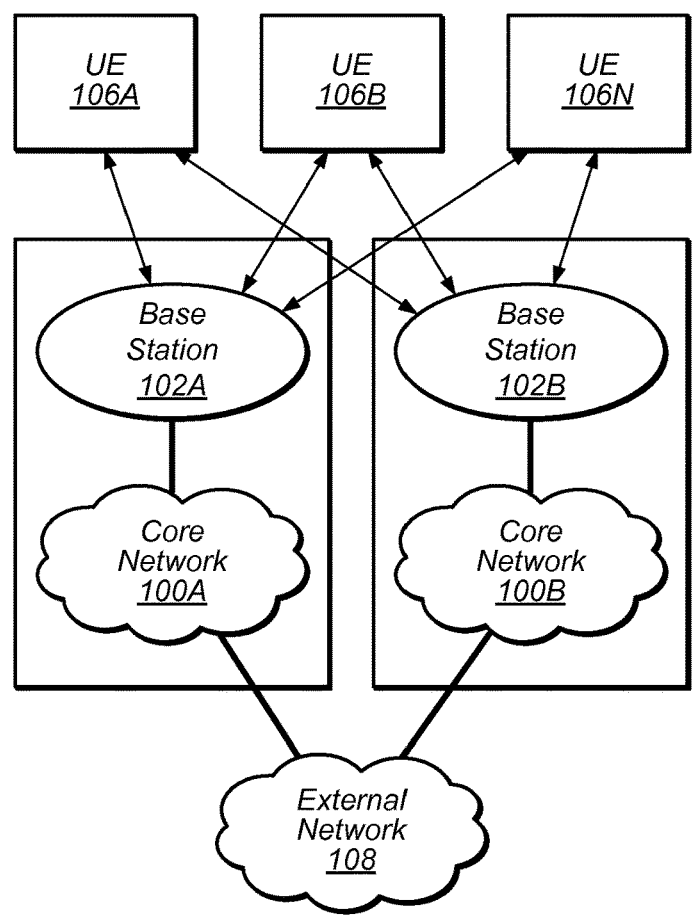
FIG. 2 illustrates a base station in communication with a user equipment device, according to some embodiments.
Figure 3:
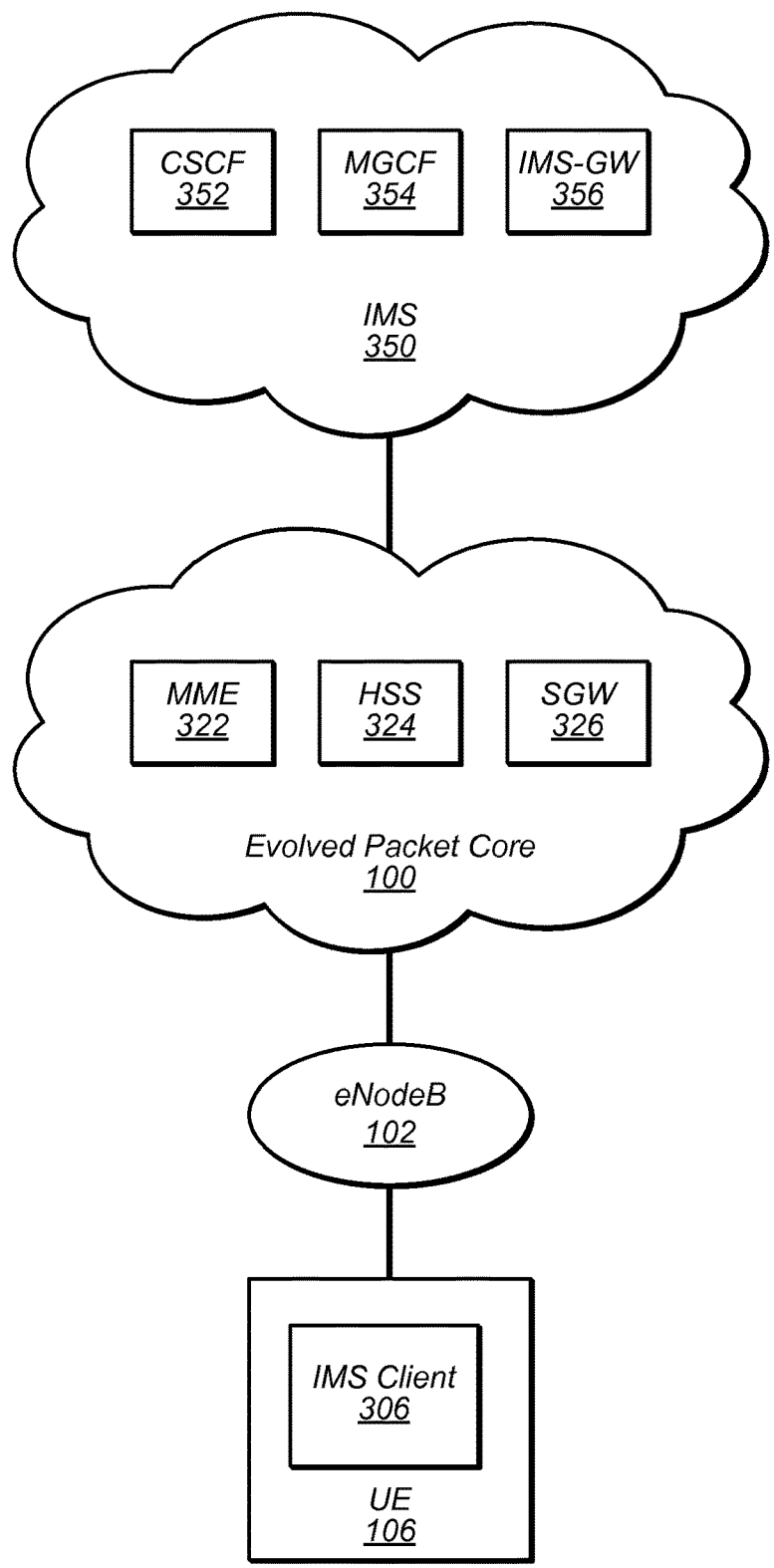
FIG. 3 illustrates a user equipment device in communication with a network via a base station, according to some embodiments.

FIGS. 1-3—Communication System

FIG. 1 illustrates a simplified communication system where a user equipment (UE) 106 is in communication with a base station 102. The UE 106 may be a device with wireless network connectivity such as a mobile phone, a hand-held device, a computer or a tablet, or virtually any type of wireless device. FIG. 2 illustrates an expanded wireless communication system involving multiple UEs 106A-N, base stations 102A and 102B, core networks 100A and 100B, and an external network 108. However, it should be noted that the system of FIG. 2 is merely one example of a possible system, and embodiments may be implemented in any of various systems, as desired.

The base stations 102 may be base transceiver stations (BTS) and/or cell sites, and may include hardware that enables wireless communication with the UEs 106. As shown in FIG. 2, each base station 102 may also be equipped to communicate with a core network 100 (e.g., base station 102A may be coupled to core network 100A, while base station 102B may be coupled to core network 100B), which may be a core network of a cellular service provider. Each core network 100 may also be coupled to one or more external networks (such as external network 108), which may include the Internet, a Public Switched Telephone Network (PSTN), and/or any other network, as desired. Thus, the base stations 102 may facilitate communication between the user devices 106 and/or between the user devices 106 and the networks 100A, 100B, and 108.

The base stations 102 and the user devices 106 may be configured to communicate over the transmission medium using any of various radio access technologies ("RATs", also referred to as wireless communication technologies) or telecommunication standards such as GSM, UMTS (WCDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B operate according to a second (e.g., different) RAT (e.g., CDMA 2000 or GSM, among other possibilities). The two networks may be controlled by the same network operator (e.g., cellular service provider or "carrier"), or by different network operators, as desired. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the exemplary network configuration shown in FIG. 2, other network configurations implementing multiple cellular communication technologies are also possible. As one example, base stations 102A and 102B might operate according to different cellular communication technologies but couple to the same core network. As another example, multi-mode base stations capable of simultaneously supporting different cellular communication technologies (e.g., LTE and CDMA2000 1xRTT, LTE and GSM, and/or any other combination of cellular communication technologies) might be coupled to a core network that also supports the different cellular communication technologies.

The UE 106 may include a processor that is configured to execute program instructions stored in memory. The UE 106 may perform any of the method embodiments described herein by executing such stored instructions. The UE 106 may also or alternatively include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple wireless communication standards (e.g., 3GPP, 3GPP2, etc.) or multiple RATs. For example, the UE 106 may be configured to communicate using two or more of GSM, CDMA2000, LTE, LTE-A, HSPA, WLAN, or GNSS, among other possibilities. In one embodiment, a UE 106 may be configured to use a first RAT that is a packet-switched technology (e.g., LTE) and a second RAT that is a circuit-switched technology (e.g., GSM or 1xRTT) while communicating with the base stations 102. Other combinations of RATs are also possible. The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc.

The UE 106 may include one or more antennas for communicating using the RAT(s). In one embodiment, the UE 106 may share one or more parts of a receive and/or transmit chain between multiple RATs; for example, the UE 106 might be configured to communicate using either of CDMA2000 (1xRTT/1xEV-DO/HRPD/eHRPD) or LTE and/or GSM or LTE, e.g., using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each RAT with which it is configured to communicate. As a further possibility, the UE 106 may include one or more radios which are shared between multiple RATs, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

FIG. 3 illustrates an exemplary, simplified portion of a wireless communication system that may be particularly useful for implementing voice or video over IP communication, such as voice over LTE (VoLTE) in an LTE network. As shown, the UE 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. Similar to the EPC 100, the IMS 350 may include various other devices known to those skilled in the art as well.

Thus, the system of FIG. 3 illustrates an exemplary portion of the data pathway that may be used for voice or video over IP communication, e.g., VoLTE.

Figure 4:
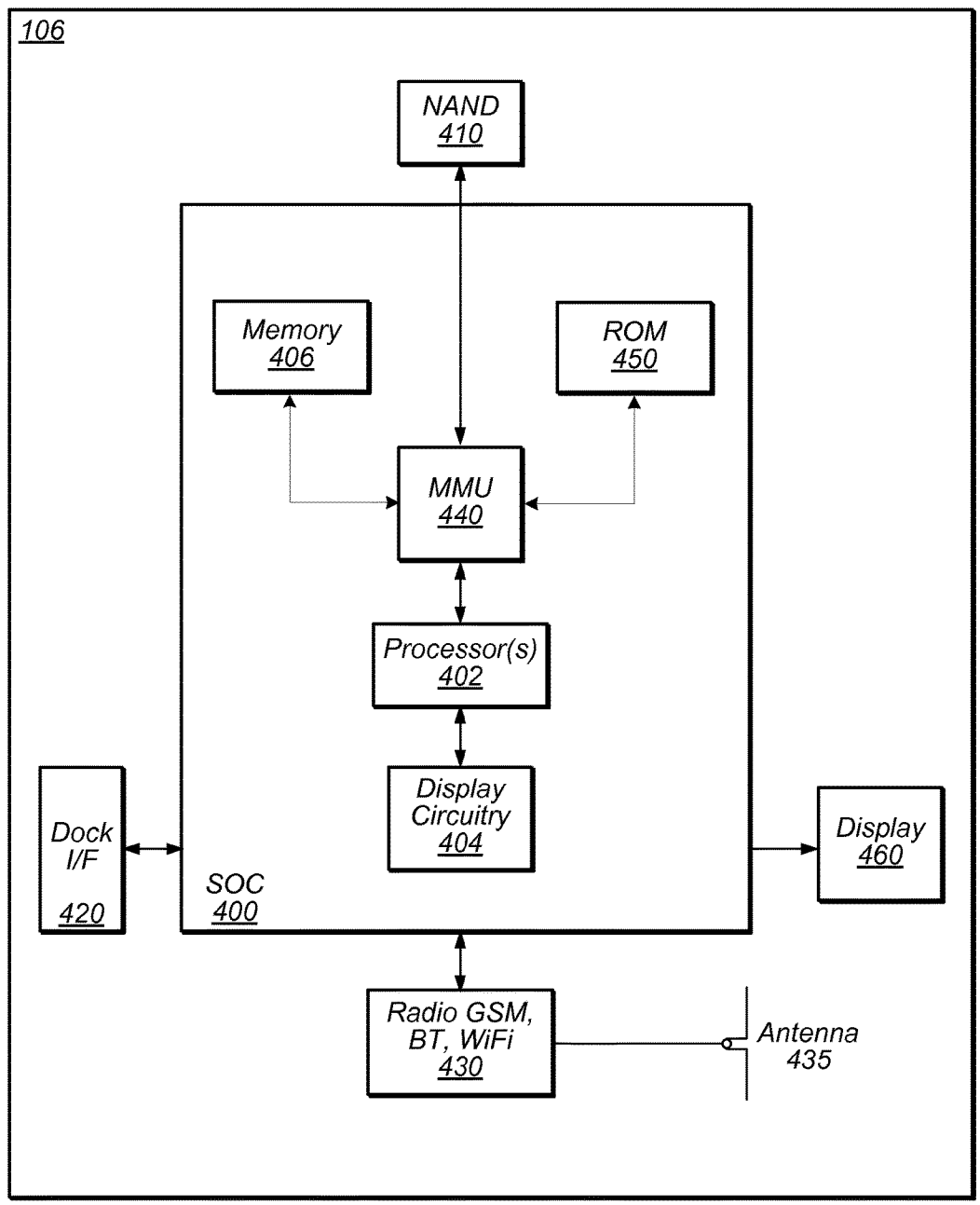
FIG. 4 is an example block diagram of a user equipment device, according to some embodiments.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry (radio(s)) 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna 435 to perform the wireless communication.

As described herein, the UE 106 may include hardware and software components for implementing features for communicating using one or more wireless communication technologies, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
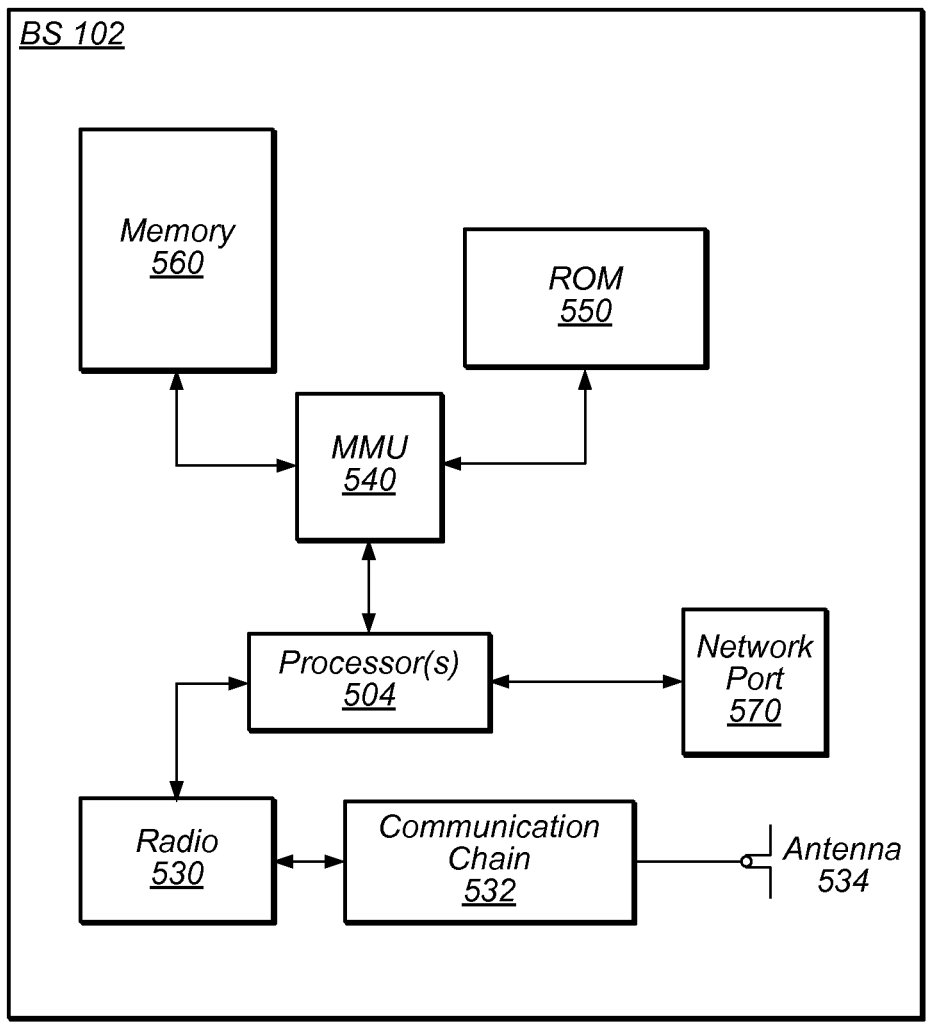
FIG. 5 is an example block diagram of a base station, according to some embodiments.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106 (see FIG. 3), access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various wireless communication technologies, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Quality of Service Class Identifiers

In order to provide consistent quality of service (QoS) across multiple environments, some wireless standards have implemented quality of service class identifier (QCI) values. In particular, these QCI values may be used to ensure that applications and/or services mapped to a QCI value receive at least the same minimum level of QoS across different environments (e.g., in multi-vendor network deployments, in case of roaming, etc.).

FIG. 6 illustrates an exemplary table of QCI values and corresponding QoS characteristics associated with those values. As shown, the table of FIG. 6 illustrates QCI values from 1-9, each being associated with different a resource type (e.g., guaranteed bit rate (GBR) or non-GBR), a priority (where a lower numerical value indicates a higher priority, and thus a higher level of QoS), a packet delay budget, a packet error loss rate, and example services. For example, a QCI value of 1 may be used for conversational voice and has a priority of 2, a guaranteed bit rate, a 100 ms packet delay budget, and a packet error loss rate of $10^{-2}$. For IMS signaling, a QCI value of 5 may be used, which has a priority of 1 (highest priority in the table), a non-guaranteed bit rate, a packet delay budget of 100 ms, and a packet error loss rate of $10^{-6}$. Other QCI values are associated with services such as conversation video (live streaming), real time gaming, non-conversational video, etc., as shown in FIG. 6.

Although a QCI value of 5 may generally be associated with "IMS signaling," e.g., as specified in GSMA IR.92 (related to VoLTE and as shown in FIG. 6, having the highest priority), the current QCI table does not distinguish between VoLTE IMS signaling and other IMS communications, which may be less urgent/important than voice communications. In some embodiments, e.g., as described below with respect to FIG. 9, an updated QCI includes different QCI values to differentiate between voice IMS signaling (e.g., VoLTE) and non-voice IMS signaling.

Exemplary VoLTE Call Setup Procedure

Figure 12:
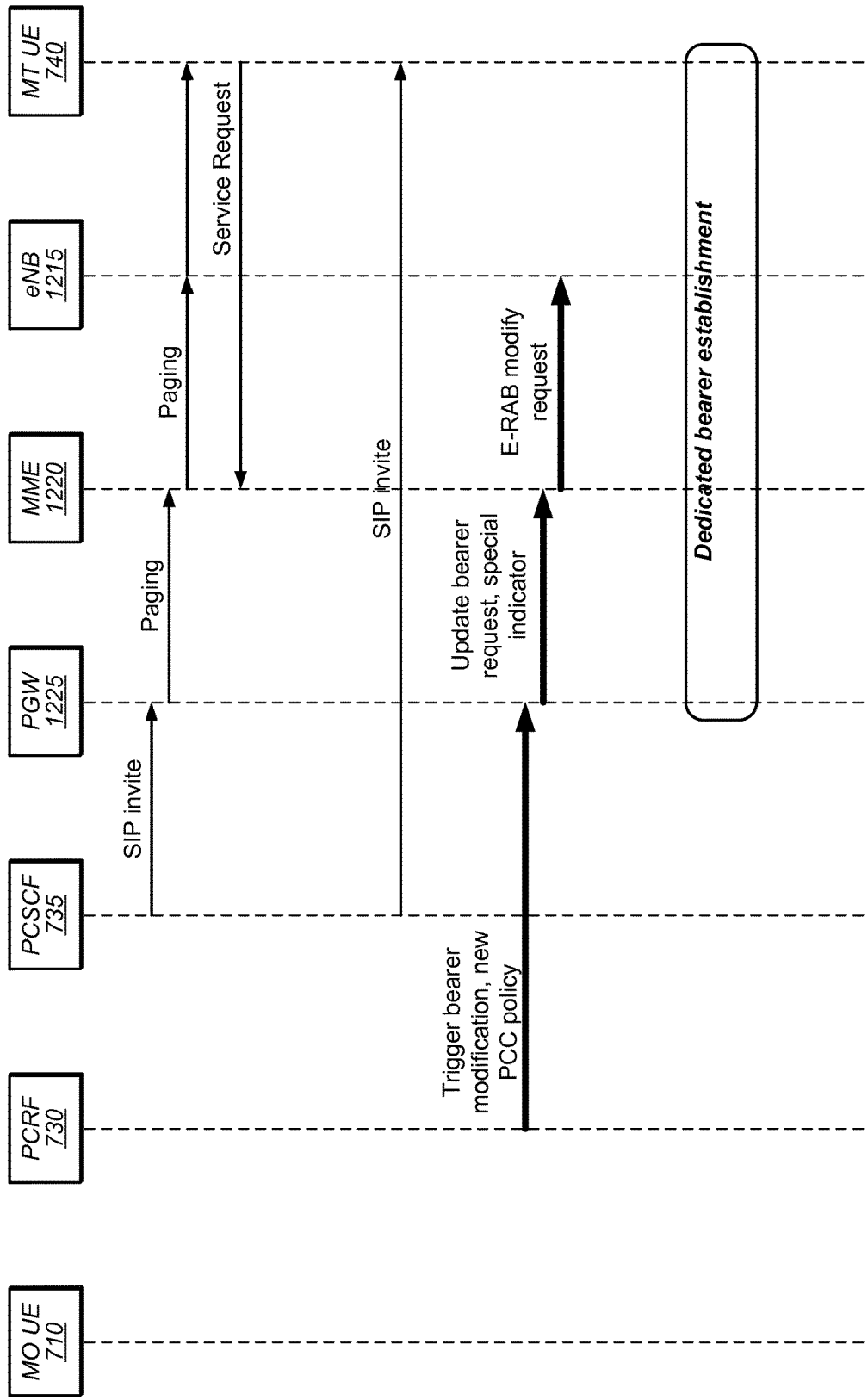

FIG. 7 is a communication diagram illustrating one embodiment of a current procedure for establishing VoLTE communication. In the illustrated embodiment, a network includes eNB 715, mobility management entity (MME) 720, packet gateway (PGW) 725, policy and charging rules function (PCRF) unit 730, and proxy call session control function (PCSCF) unit 735. In the illustrated embodiment, message originating (MO) UE 710 is configured to communicate with message terminating (MT) UE 740 via the network. In some embodiments, the network includes additional elements (not shown) configured to service MT UE (740) (e.g., a PGW, a MME, and/or an eNB may be included in the network for MT UE 740 as shown in FIG. 12).

eNB 715, in the some embodiments, is configured similarly to base station 102 described above with reference to FIGS. 1-3 and 5. eNB 715, in some embodiments, is configured to communicate directly with MME 720 and a serving gateway (SGW) (not shown), e.g., using an S1 interface. In some embodiments, eNB 715 is configured to provide a particular quality of service for VoLTE communications based on an indication received from a UE and/or an element of the network that the UE requests packet-switched voice communications, where the indication is received prior to establishing an IMS bearer for the UE.

MME 720, in the illustrated embodiment, is configured to perform tracking and paging for UEs and is involved in bearer activation and deactivation procedures. In some embodiments, MME 720 is configured to choose a SGW for a UE during an initial attach process. In the illustrated embodiment, MME 720 is configured to communicate directly with eNB 715 (e.g., using an S1 interface which may include a stack with the following protocols: IP, stream control transmission protocol (SCTP), and S1 application part (S1AP)). In some embodiments, MME is configured to communicate with PGW 725 via a SGW (e.g., using an S11 interface which may include a stack with the following protocols: IP, user datagram protocol (UDP), and general packet radio service tunneling protocol control (eGTP-C)).

PGW 725, in the illustrated embodiment, is configured to communicate with MME 720 (e.g., via a SGW) and PCRF 730. In some embodiments, PGW 725 is configured to provide connectivity for UEs to an external packet data network. PGW 725 may be configured to manage policy enforcement, packet filtration, and/or charging support. In some embodiments, PGW is configured to interface with a SGW assigned to MO UE 710 using an S5/S8 interface. A given UE may be assigned to multiple PGWs simultaneously, in some embodiments.

PCFR unit 730, in the illustrated embodiment, is configured to manage QoS rules or policies and may provide an interface to billing and charging systems. PCFR unit 730 may facilitate devices outside of a 3GPP network accessing the LTE network. The functionality of PCRF unit 730 may be specified by a 3GPP standard as a software node, which may be implemented by any of various appropriate hardware (e.g., servers coupled to the network) in various embodiments.

PCSCF unit 735, in the illustrated embodiment, is a session initiation protocol (SIP) proxy and is configured to inspect IMS signals. In some embodiments, PCSCF unit 735 may be configured to: ensure that IMS terminals obey network policies, authenticate subscribers, compress/decompress SIP messages, generate charging records, and/or authorize QoS over the media plane.

The term "bearer" refers to a configuration between endpoints for transmitting data. In the evolved packet system (EPS) context, bearers may be characterized by their endpoints, a flow specification (e.g., a guaranteed and/or maximum bit rate), a QCI, and/or a filter specification. In some embodiments, the "EPS bearer" is a default bearer between a UE and a PGW. In some embodiments, the "e-RAB" (e-Radio Access Bearer) is a bearer between a UE and a SGW. In some embodiments, the "radio bearer" is between a UE and base station, the "S1 bearer" is between the base station and SGW, and the "S5/S8 bearer" is between the SGW and PGW.

Figure 13:
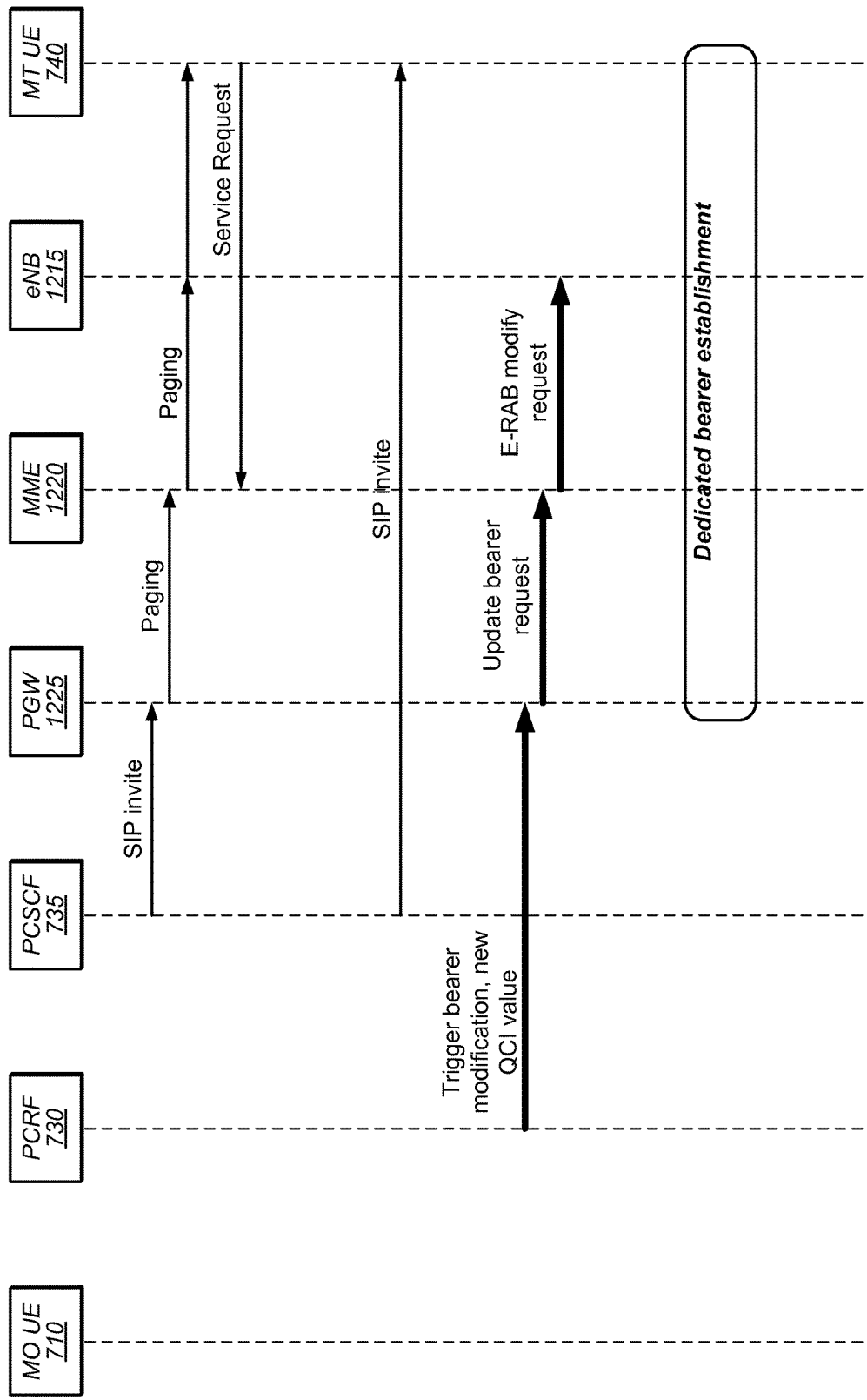
Figure 14:
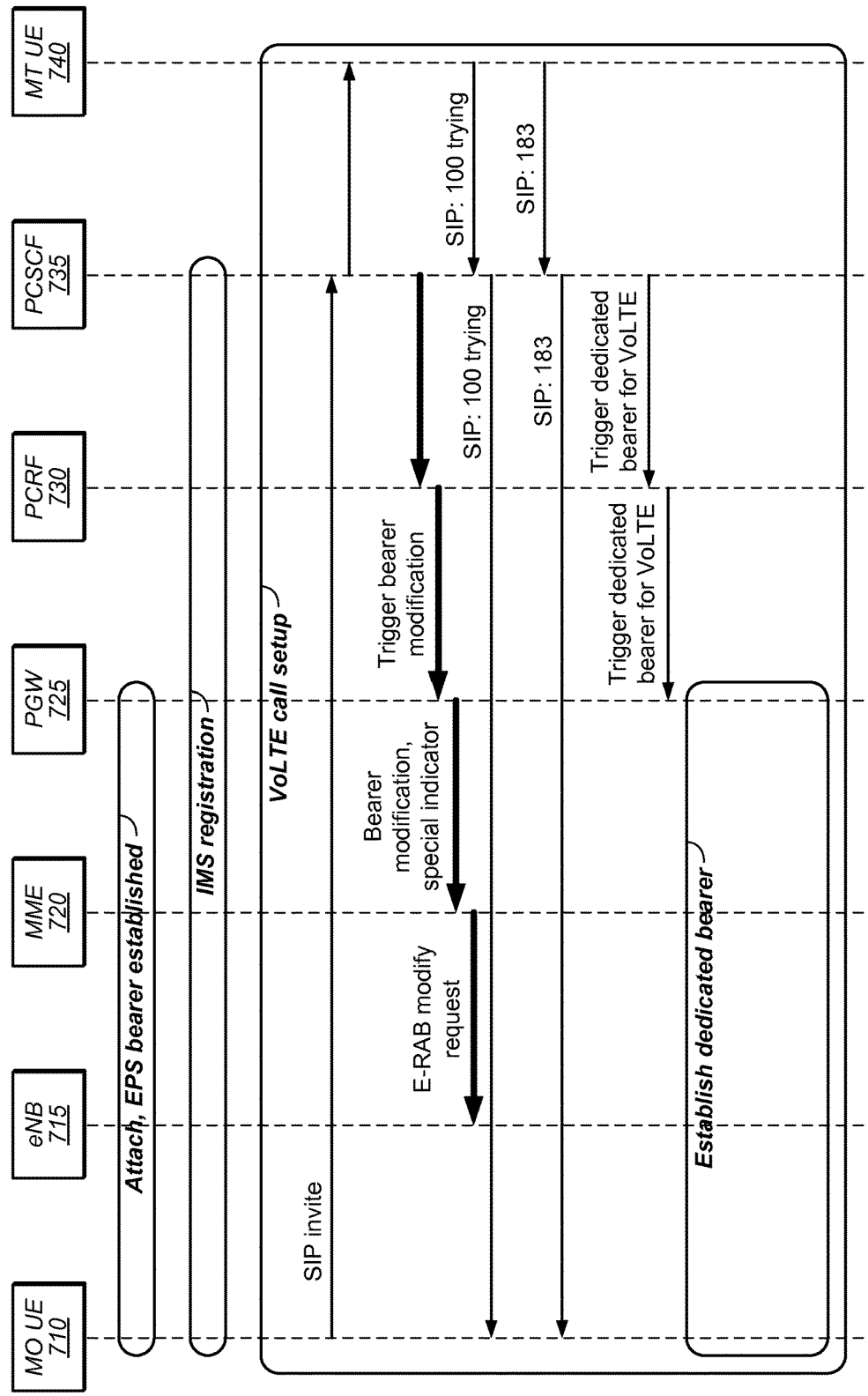
Figure 15:
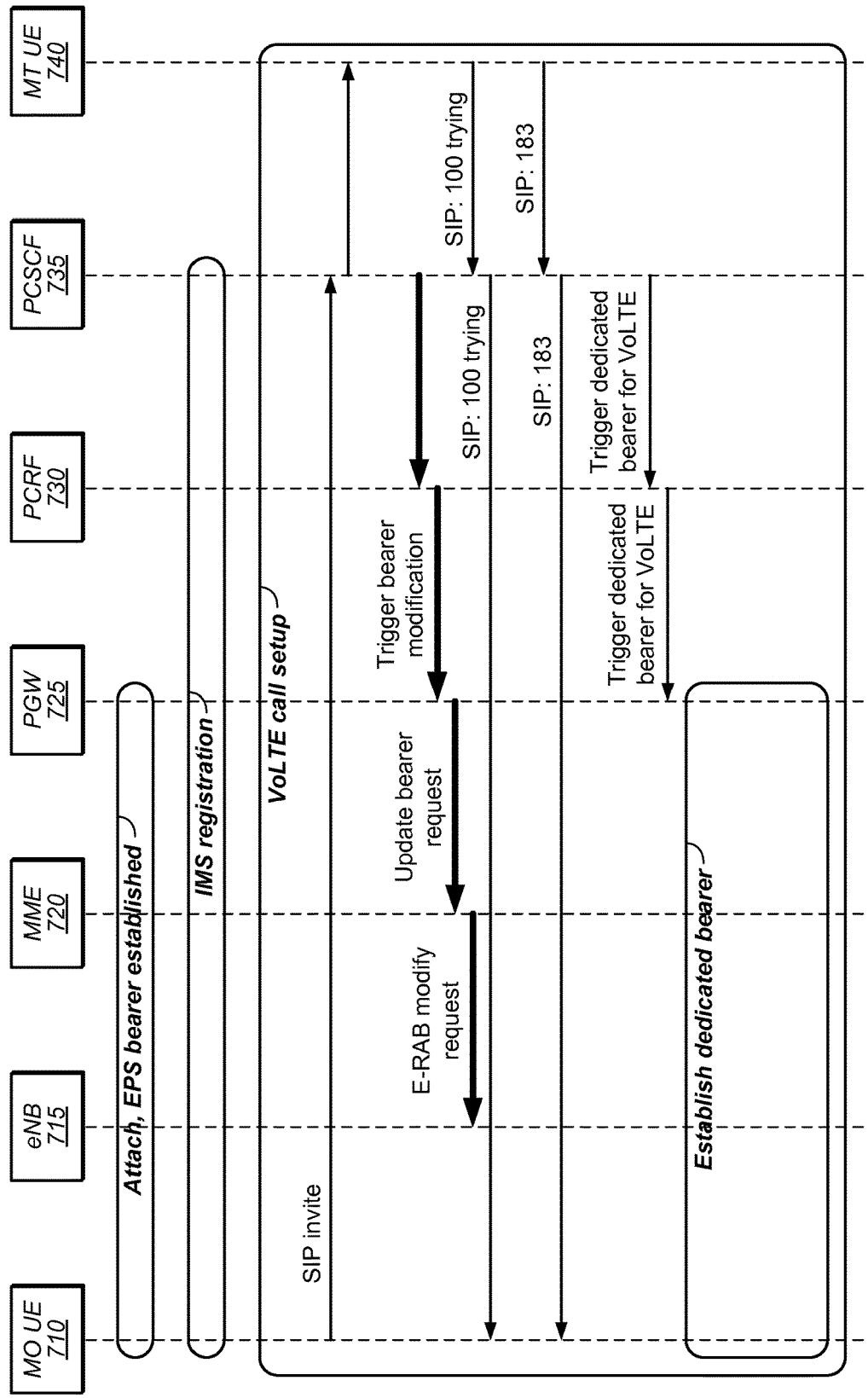

The various techniques disclosed herein for MO UE 710 may be utilized for MT UE 740 and vice versa, as appropriate. For example, FIGS. 12 and 13 show signaling for MT UE 740 for exemplary purposes, but similar techniques may be utilized for MO UE 710, as shown in FIGS. 14 and 15.

In some embodiments, various elements of FIG. 7 may be communicatively coupled in different configurations and/or omitted. The functionality of various elements may be implemented by hardware at various locations to facilitate communication between UEs 710 and 740 and/or other UEs. In some embodiments, additional elements (not shown) may be included in the network.

In the illustrated embodiment, the MO UE 710 initiates an attach procedure and a default bearer is established in procedure 750. The UE may initiate the connection using a radio resource control (RRC) connection request message. Attachment may include authentication and may result in establishment of an evolved packet core (EPC) default bearer for the UE.

Subsequently, the UE initiates IMS registration procedure 755. This may involve sending an IMS register request to PCSCF 735 and further authentication using some shared secret data (SSD).

Subsequently, VoLTE call setup procedure 760 is initiated. In the illustrated embodiment, MO UE 710 sends a SIP invite to MT UE via PCSCF. In the illustrated embodiment, MT UE 740 responds with a SIP 100 "trying" code, which may indicate that an extended search is being performed. In the illustrated embodiment, MT UE 740 then sends a SIP 183 code, which may indicate that a session is in progress and/or be used to send extra information for a call being setup.

In the illustrated embodiment, PCSCF 735 and/or PCRF 730 then trigger one or more dedicated bearers which are established in procedure 765. In some embodiments, dedicated bearers with QCI=1 are established for VoLTE communications.

In the illustrated procedure, a procedure 765 to establish a dedicated bearer is initiated before it is known whether VoLTE communications are desired or whether the dedicated bearer will be used for other IMS functionality. For example, a QCI value of 5 may be utilized for IMS, which does not differentiate between VoLTE and other IMS signaling. This may be undesirable for several reasons.

First, for congestion control and/or data scheduling in a radio access network (RAN), it would be useful to be able to determine when a UE will request VoLTE communication prior to establishing dedicated bearers. This may allow the network to handle user plane bearers more efficiently, in some embodiments.

Second, IMS signaling may be scheduled on unlicensed radio bands (e.g., industrial, scientific, and medical (ISM) bands) when carrier aggregation is used. For example, IMS signaling may use secondary serving cells (Scells) deployed on unlicensed bands in the LTE-U context. This may be undesirable for VoLTE signals, e.g., because VoLTE QoS requirements may not be met on ISM bands.

Third, some networks allow VoLTE communication only using LTE frequency division duplexing (FDD) and not LTE time division duplexing (TDD), e.g., based on regulations in certain areas. If the dedicated bearers are initially established on LTE TDD, a handover to LTE FDD may be required before performing VoLTE communications, increasing signal load and potentially degrading system performance.

Therefore, in some embodiments, the network is configured to transmit information to eNB 715 indicating that a UE will request voice communication over a packet-switched network (e.g., VoLTE) before a dedicated bearer is established for the communication.

In some embodiments, eNB 715 is configured to control congestion, schedule data, and/or configure user plane bearers based on this information. For example, eNB 715 may be configured to utilize this information to determine which bearer(s) to drop when radio resources are limited, in some embodiments. Further, eNB 715 may be configured to drop bearers for other IMS signaling but not for VoLTE, in some embodiments. In some embodiments, eNB 715 is configured to assign scheduling weights, admission thresholds, queue management thresholds, link layer protocol configuration, etc., based on this information. In some embodiments, eNB 715 is configured to determine whether to accept or reject bearer establishment/modification requests based on this information.

In some embodiments, eNB 715 is configured to ensure that voice communications over the packet-switched network are not deployed on unlicensed bands based on this information.

In some embodiments, eNB 715 is configured to setup packet-switched voice communications using FDD and not TDD based on this information.

Various embodiments herein are described in the context of VoLTE transmissions, but similar techniques may be used in other embodiments to differentiate between any of various types of packet-switched voice and/or video communications and other communications.

Figure 8:
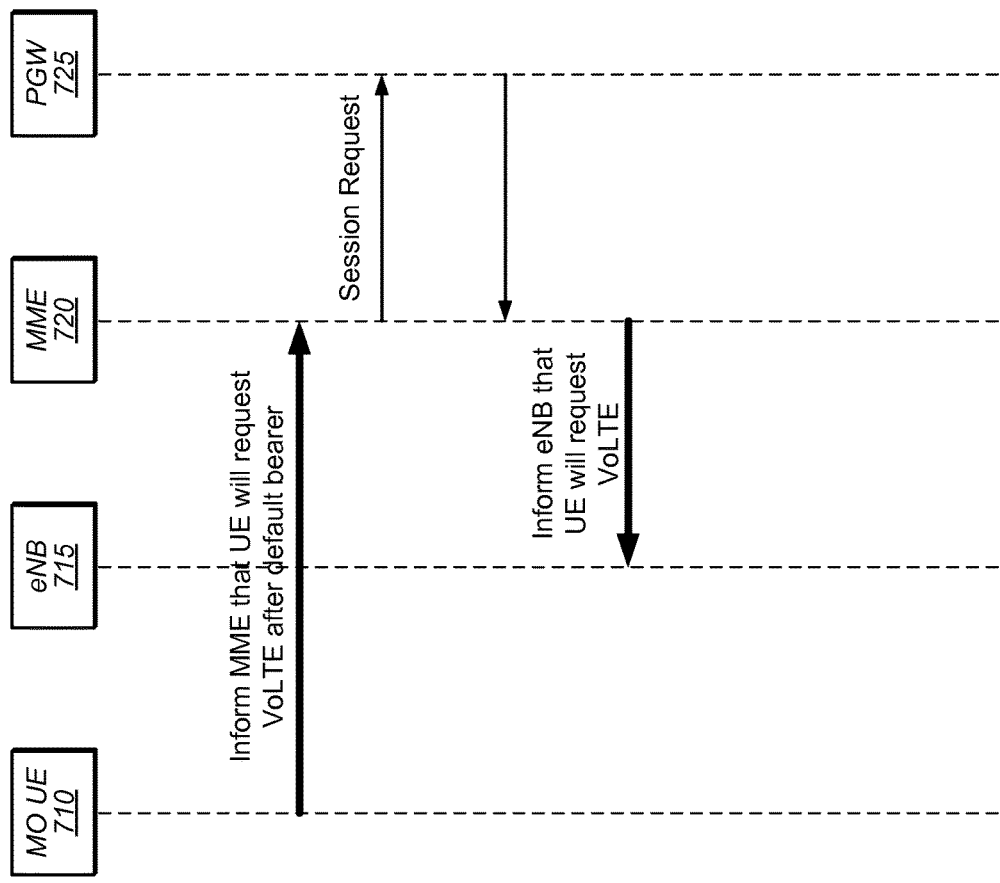
FIG. 8 is a communication diagram illustrating one embodiment of a procedure for indicating to a base station that a UE is requesting VoLTE.

Exemplary Techniques for Determining that a UE Desires Voice Communications Over Packet-Switched Network FIG. 8 is a communication diagram illustrating one embodiment of a procedure for indicating to eNB 715 that MO UE 710 will request VoLTE. In the illustrated embodiment, MO UE 710 sends a message to MME 720. In the illustrated embodiment, the message informs MME 720 that MO UE 710 desires VoLTE communication after the default bearer is established. This may occur during an attach procedure and/or during establishment of an EPS bearer, for example. In the illustrated embodiment, MME 720 then sends a session request to PGW 725 and PGW 725 responds. In the illustrated embodiment, MME 720 then informs eNB 715 that MO UE 710 will request VoLTE, e.g., using a special indicator. In some embodiments, this may occur using an initial context setup message. In the illustrated embodiment, eNB 715 is informed that MO UE 710 requests VoLTE before a dedicated IMS bearer has been established. In various embodiments, eNB 715 is configured to schedule radio resources based on this information.

In one embodiment, MO UE 710 is configured to use a particular access point name (APN) to inform MME 720 that MO UE 710 will request VoLTE. For example, in one embodiment the network ID included in the APN may indicate VoLTE. For example, in embodiments in which "IMS" is used to indicate IMS services, "IMSvoice" may be used in the network ID to indicate VoLTE over IMS. In other embodiments, other indicators may be used in an attach request or during EPS bearer establishment to inform MME 720 that MO UE 710 will request VoLTE.

FIG. 9 is a table illustrating one embodiment of an updated QCI table. In the illustrated embodiment, QCI value 5 of FIG. 6 (corresponding to IMS signaling) has been replaced with QCI values 5.1 and 5.2. In the illustrated embodiment, QCI=5.1 indicates IMS signaling for VoLTE while QCI=5.2 indicates IMS signaling for non-VoLTE. This may allow the network to distinguish between VoLTE and non-VoLTE IMS signaling.

The QCI values "5.1" and "5.2" have been provided for exemplary and explanatory purposes, but any of various appropriate QCI values may be used to differentiate between VoLTE and non-VoLTE IMS signaling in other embodiments.

Figure 10:
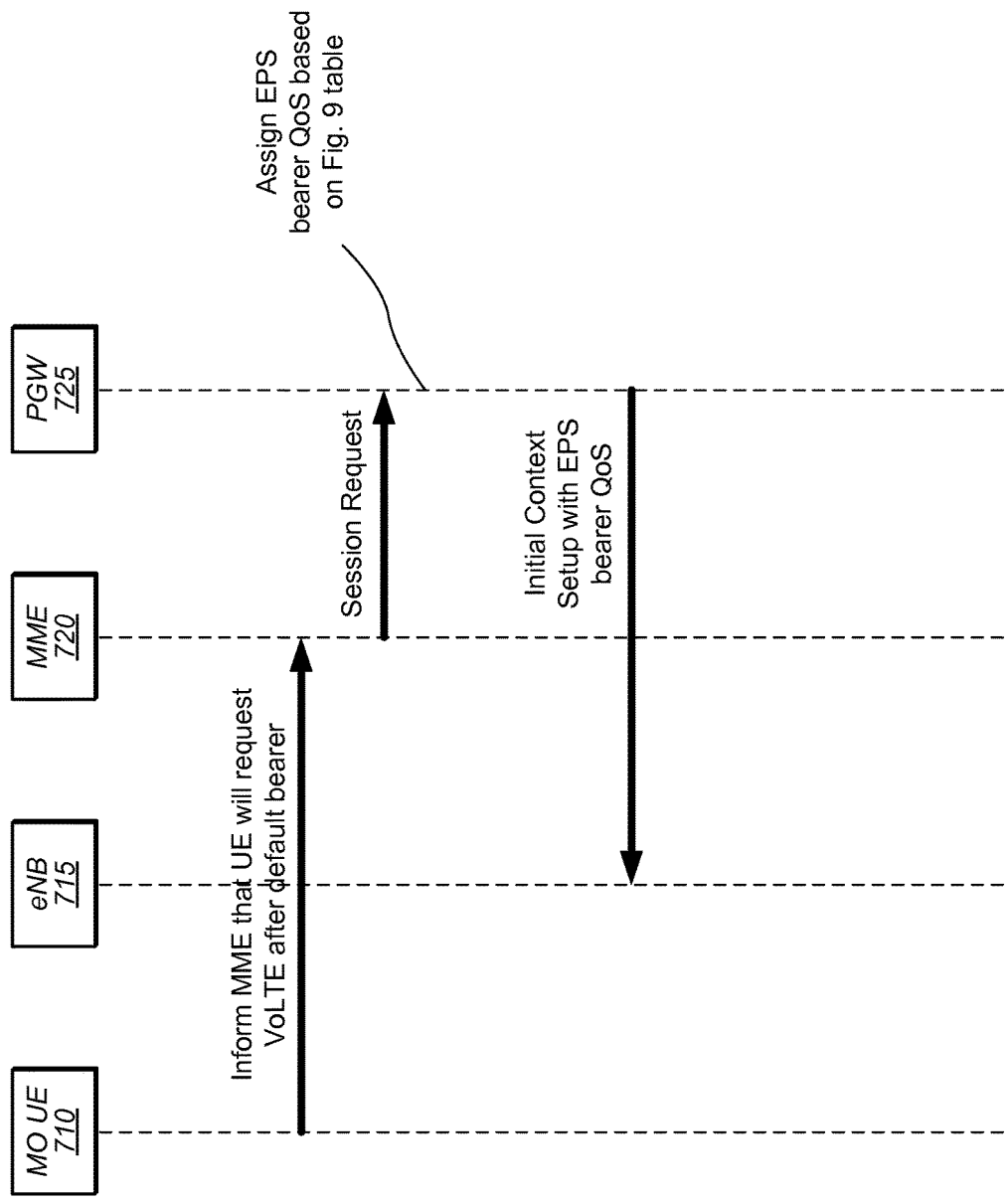
FIGS. 10-16 are communication diagrams illustrating exemplary embodiments of procedures for indicating to a base station that a UE is requesting VoLTE.

FIG. 10 is a communication diagram illustrating one embodiment of a procedure for indicating to eNB 715 that MO UE 710 will request VoLTE using an updated QCI value. In the illustrated embodiment, MO UE 710 sends a message to MME 720. In the illustrated embodiment, the message informs MME 720 that MO UE 710 will request VoLTE after a default bearer is established.

In the illustrated embodiment, MME 720 then sends a session request to PGW 725, and the session request indicates that the UE desires VoLTE. In the illustrated embodiment, PGW 725 is configured to send an initial context setup message with an EPS bearer QoS that uses a QCI value (e.g., QCI value 5.1 from FIG. 9) that indicates that the UE will request VoLTE. In various embodiments, eNB 715 is configured to schedule radio resources based on this information. In this embodiment, a special indicator to eNB 715 for VoLTE is not needed, as the eNB is informed that the UE desires VoLTE based on the QCI value.

Figure 11:
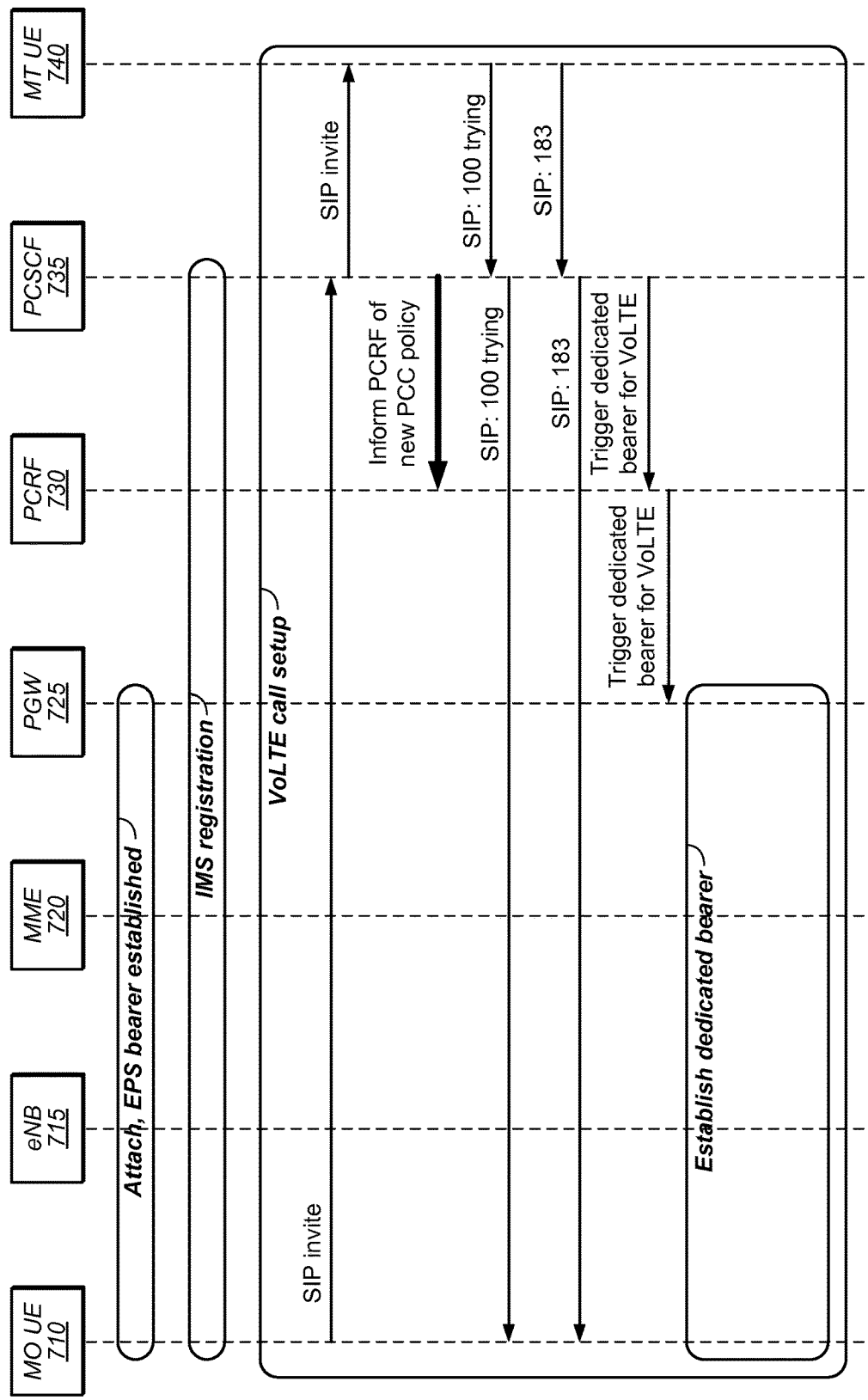

FIG. 11 is a communication diagram illustrating one embodiment of a procedure for informing PCRF 730 of a new Policy and Charging Control (PCC) policy. Other than the signaling in bold, the procedures in FIG. 11 may be similar to those described above with reference to FIG. 7. In the illustrated embodiment, PCSCF 735 is configured to inform PCRF 730 of one or more PCC rules which indicate that an EPS bearer is for a UE requesting IMS signaling for VoLTE. PCRF 730 may use this information in various ways, e.g., as described below with reference to FIGS. 12-15 and 19.

FIG. 12 is a communication diagram illustrating one embodiment of another procedure for indicating to eNB 715 that MT UE 740 is requesting VoLTE. In the illustrated embodiment, the network includes PGW 1225, MME 1220, and eNB 1215, which may be configured similarly to the PGW 725, MME 720, and eNB 715 described above with reference to FIG. 7 and configured to service MT UE 740. In the illustrated embodiment, PCSCF 735 transmits a SIP invite to PGW 1225 which results in paging to eNB 1215 and MT UE 740, a service request from MT UE 740 to MME 1220, and a SIP invite to MT UE 740.

PCRF 730, in the illustrated embodiment, is configured to trigger a bearer modification, before a dedicated bearer is established for IMS signaling, using the new PCC policy discussed above with reference to FIG. 11. In the illustrated embodiment, PGW 1225 is configured to implement a Policy and Charging Enforcement Function (PCEF) for the PCC rule. Thus, in this embodiment, in response to the bearer modification trigger, PGW 1225 is configured to transmit an update bearer request (which may include a special indicator that the UE requests IMS signaling for VoLTE) to MME 1220 and MME 1120 is configured to transmit an e-RAB (e-Radio Access Bearer) modify request to eNB 1215 (which may include the special indicator or a similar indicator). Based on this information, in the illustrated embodiment eNB 1215 is configured to schedule dedicated bearer establishment optimized for VoLTE.

FIG. 13 is a communication diagram illustrating one embodiment of another procedure for indicating to eNB 715 that MT UE 740 is requesting VoLTE using an updated QCI value. In the illustrated embodiment, PCRF 730 triggers a bearer modification using new QCI value that indicates the UE requests IMS signaling for VoLTE (e.g., a value of 5.1 if utilizing the table of FIG. 9). In response, in the illustrated embodiment, PGW 1225 is configured to transmit an update bearer request and MME 1220 is configured to transmit an e-RAB modify request. In the illustrated embodiment, these requests may not include special identifiers for VoLTE, e.g., because the QCI value already indicates VoLTE communications.

FIGS. 14 and 15 are communication diagrams illustrating embodiments of procedures for indicating to eNB 715 that MO UE 710 is requesting VoLTE. Other than the signaling in bold, the procedures in FIGS. 15 and 16 may be similar to those described above with reference to FIG. 7. FIGS. 14 and 15 illustrate techniques for MO UE 710 call flow similar to those shown in FIGS. 12 and 13 respectively for MT UE 740 call flow. In the illustrated embodiments, PCRF 730 is configured to trigger a bear modification that indicates that MO UE 710 requests IMS signaling for VoLTE before a dedicated bearer is established for IMS signaling. In the illustrated embodiment of FIG. 14 a special indicator is used while in the embodiment of FIG. 15 an updated QCI value is used (which may remove any need for a special indicator other than the QCI value for eNB 715).

Figure 16:
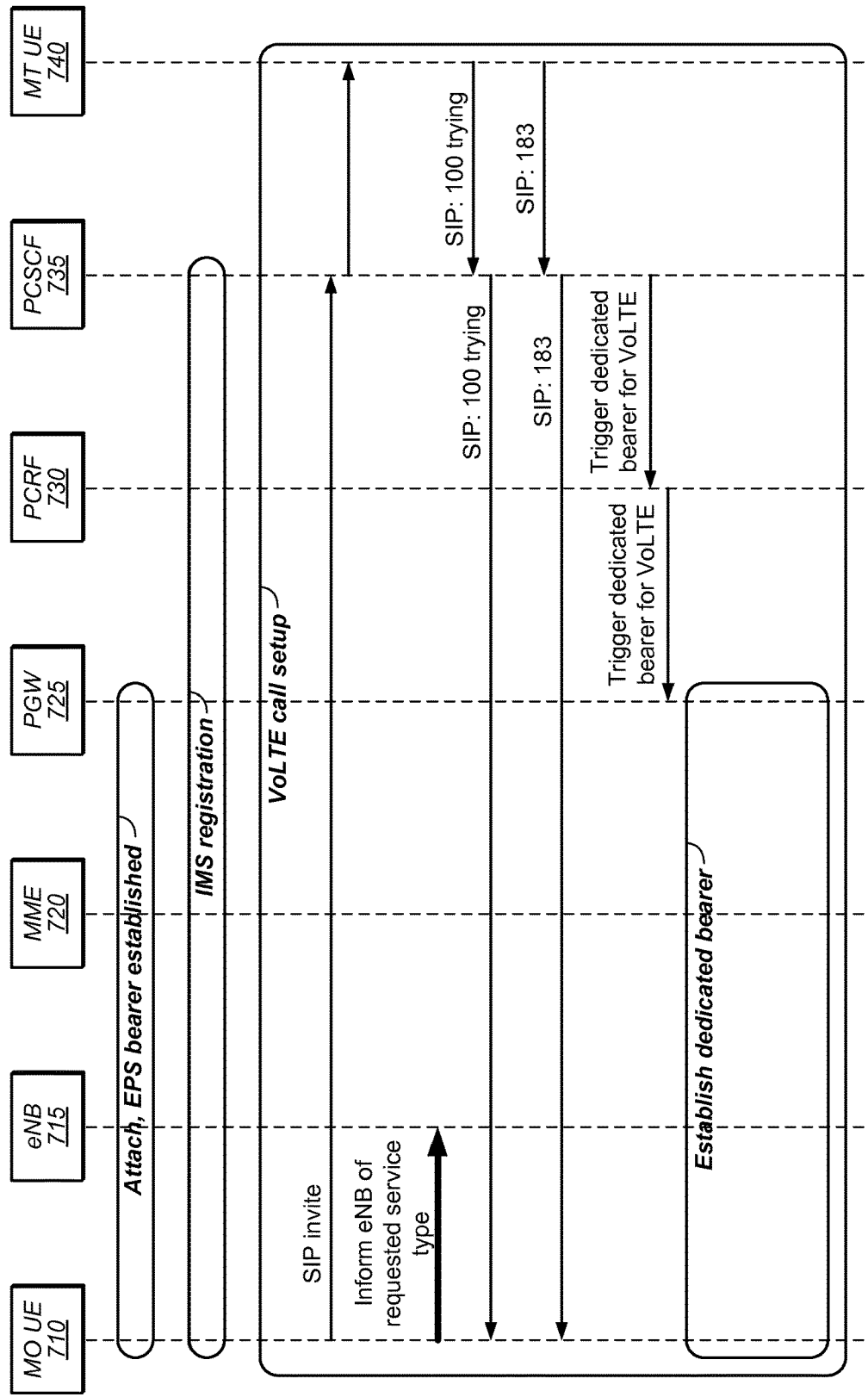

FIG. 16 is a communication diagram illustrating one embodiment of another procedure for indicating to eNB 715 that MO UE 710 is requesting VoLTE. Other than the signaling in bold, the procedures in FIG. 16 may be similar to those described above with reference to FIG. 7. In the illustrated embodiment, MO UE 710 is configured to directly inform eNB 715 that it is requesting IMS signaling for VoLTE. In some embodiments, MO UE 710 is configured to transmit this information using a radio resource control (RRC) message during an attach procedure. In some embodiments, the RRC message informs eNB 715 of an upper layer service requested type, e.g., a SIP message for voice that informs eNB 715 that this IMS signaling is for voice. In some embodiments, MO UE 710 is configured to transmit this message in a Non-access Stratum (NAS) message. In some embodiments, this message may utilize an updated ULInformationTransfer format. In some embodiments (not shown), the technique of FIG. 16 may be used by MT UE 740 in a similar manner to indicate to eNB 1215 that MT UE 740 is requesting VoLTE.

FIG. 17 is a table illustrating a VoLTE inform event entry. In one embodiment, the entry of FIG. 17 is added to a table such as table 6.1 in TS 23.203. In the illustrated embodiment, the event trigger is VoLTE inform, e.g., based on information received from MO UE 710 or MT UE 740. In the illustrated embodiment, the event is reported from PCRF 730 based on a PCEF (Policy and Charging Enforcement Function) condition for reporting. The illustrated trigger may be utilized in the procedures of FIGS. 12-15 and 19, in some embodiments.

Figure 18B:
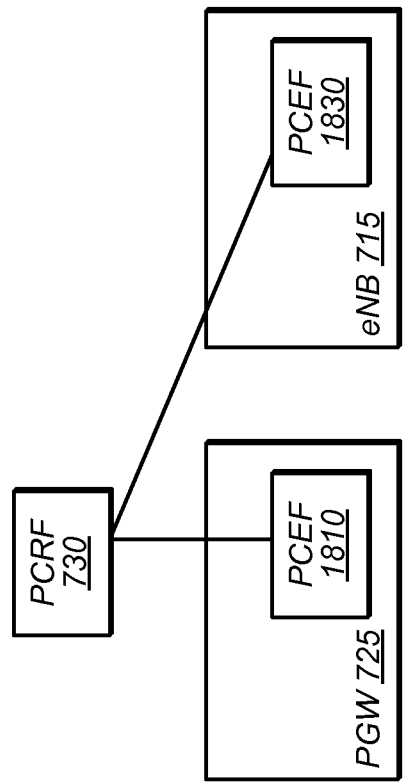
FIGS. 18A and 18B are block diagrams illustrating exemplary embodiments of Policy and Charging Enforcement Function (PCEF) implementations.
Figure 18A:
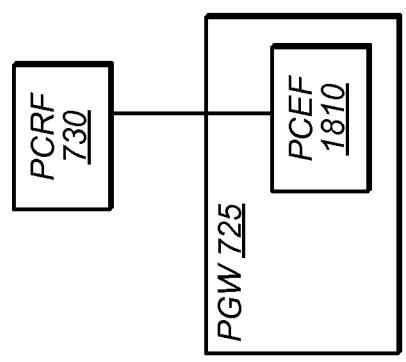

FIG. 18A is a block diagram illustrating an exemplary PCEF configuration. In the illustrated embodiment, PGW 725 is configured to implement PCEF 1810. In one embodiment, PCRF 730 is configured to communicate with PCEF 1810 via a Gx interface, which may be used to provide and/or remove PCC rules and/or indicate plane events, for example. PCRF 730 is configured inform PCEF 1810 how to treat each data flow (e.g., QoS requirements, charging, gating, etc.) using PCC rules, in some embodiments.

FIG. 18B is a block diagram illustrating one embodiment of a network in which eNB 810 is configured to implement PCEF 1830. This may allow PCRF 730 to communicate PCC rules directly to eNB 715, which may be preferable to traditional embodiments in which a PCEF is implemented by PGW 725 or a standalone unit. In the illustrated embodiment, PCRF 730 is configured to communicate PCC rules to PCEF 1830. This configuration is used in the embodiment of FIG. 19, described below.

Figure 19:
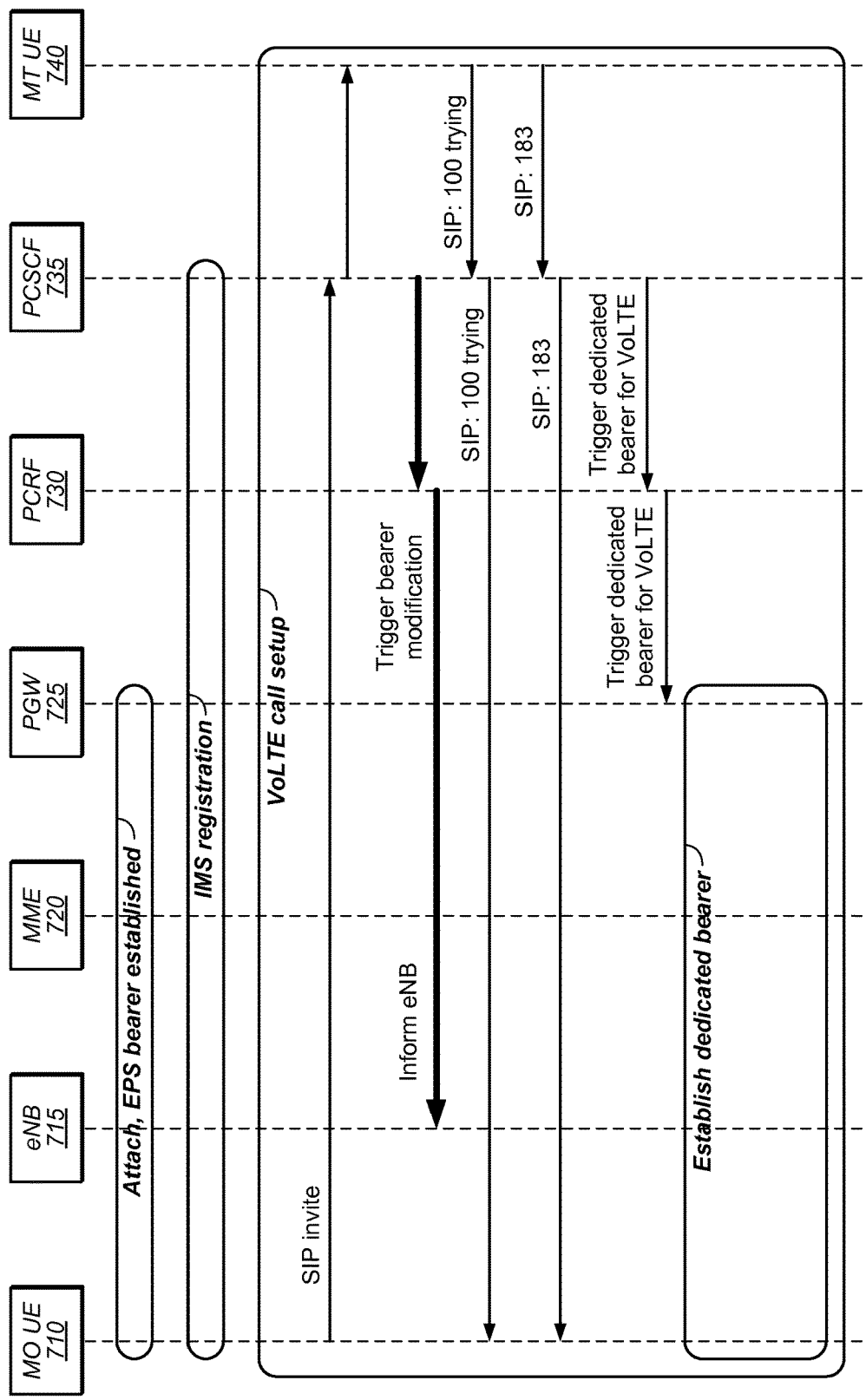
FIG. 19 is a communication diagram illustrating another embodiment of a procedure for indicating to a base station that a UE is requesting VoLTE.

FIG. 19 is a communication diagram illustrating yet another technique for procedure for indicating to eNB 715 that MO UE 710 is requesting VoLTE. In some embodiments, PCSCF 735 is configured to notify PCRF 730 of a new PCC policy, e.g., as discussed above with reference to FIG. 11. Other than the signaling shown in bold, the procedures in FIG. 19 may be similar to those described above with reference to FIG. 7. In the illustrated embodiment, PCRF 730 is configured to trigger a bearer modification before a dedicated bearer is established for IMS signaling. In the illustrated embodiment, PCRF 730 is configured to inform eNB 715 of the bearer modification, e.g., using a PCC rule. In one embodiment, this is based on a trigger event corresponding to the table of FIG. 17. In one embodiment, PCRF 730 is configured to inform eNB 715 that the UE requests IMS signaling for VoLTE using the PCEF 1830 implemented by eNB 715, e.g., using PCC rules. In this embodiment eNB 715 is configured to determine that MO UE 710 is requesting VoLTE using PCEF 1830.

Figure 20:
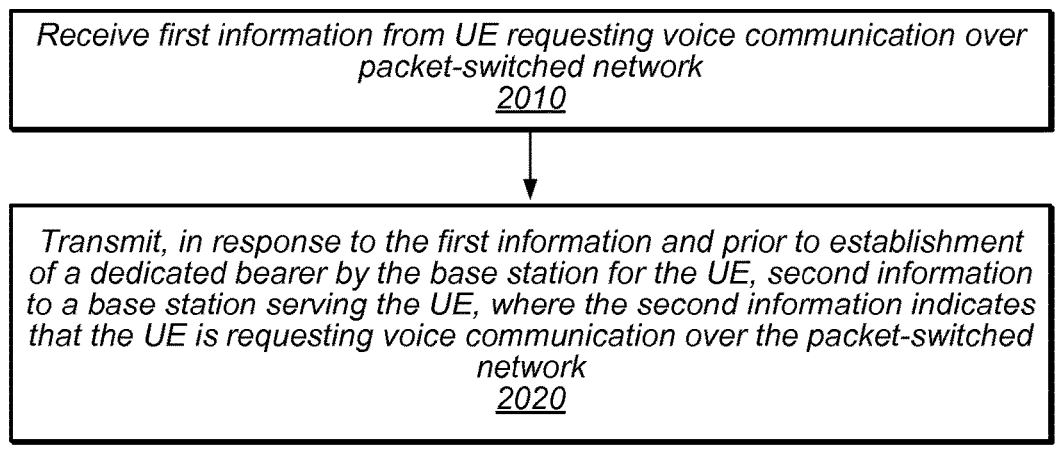
FIG. 20 is a flow diagram illustrating a method for indicating to a base station that a UE is requesting VoLTE, according to some embodiments.

FIG. 20 is a flow diagram illustrating one embodiment of a method for notifying a base station that a UE requests packet-switched voice communication. The method shown in FIG. 20 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. The flow begins at 2010.

At 2010, first information is received from a UE requesting voice communication over a packet-switched network. In one embodiment, the first information indicates that the UE will request IMS signaling for VoLTE after a default bearer has been established for the UE. In some embodiments, MME 720 is configured to receive the first information. In some embodiments, other elements of the network are configured to receive the first information.

At 2020, second information is transmitted to a base station serving the UE. In this embodiment, the transmitting is performed in response to the first information and is performed prior to establishment of a dedicated bearer (e.g., a dedicated bearer for IMS) by the base station for the UE. In this embodiment, the second information indicates that the UE is requesting voice communication over the packet-switched network. In some embodiments, the second information is transmitted to an eNB, which is configured to efficiently configure communications between the base station and the UE device to provide a particular QoS for the UE based on the second information. For example, the eNB may provide a higher QoS for VoLTE communications over IMS than for non-VoLTE IMS communications. In some embodiments, the eNB is configured to allocate radio resources to the UE based on the second information. The flow ends at 2020.

FIG. 21 is a flow diagram illustrating one embodiment of a method for notifying a base station that a UE requests packet-switched voice communication. The method shown in FIG. 21 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. The flow begins at 2110.

At 2110, a UE transmits information requesting voice communication over a packet-switched network. In the illustrated embodiment, the UE transmits the information prior to establishment of a dedicated bearer by a base station for the UE. In the illustrated embodiment, the information operations to configure communications between the base station and the UE to provide a particular quality of service using the dedicated bearer.

At 2120, the UE communicates with the base station using the dedicated bearer.

FIG. 22 is a flow diagram illustrating one embodiment of a method for handling a notification that a UE requests packet-switched voice communication. The method shown in FIG. 22 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 2210.

At 2210, a base station receives, prior to establishment of a dedicated bearer for communications with a UE, information indicating that the UE is requesting voice communication over a packet-switched network.

At 2220, the base stations configures one or more dedicated bearers for the UE to provide a particular quality of service for the packet-switched voice communication based on the received information.

Further Embodiments

Note that in the present description, various embodiments are described in the context of LTE (Long-term evolution of UTMS). However, it is noted that the methods described herein can be generalized for indicating to a base station that a UE is requesting packet-switched voice communication.

In some embodiments, a base station includes at least one antenna, at least one radio configured to perform cellular communication using at least one radio access technology (RAT), and one or more processors coupled to the at least one radio. In some embodiments, the base station is configured to receive, prior to establishment of a dedicated bearer for internet protocol multimedia subsystem (IMS) communications with a user equipment (UE) device, information indicating that the UE device is requesting voice communication over a packet-switched network; and configure one or more dedicated bearers for the UE device to provide a particular quality of service for the packet-switched voice communication based on the received information.

In some embodiments, the base station is configured to schedule the one or more dedicated bearers to reduce congestion and/or schedule data on a radio access network (RAN) based on the information. In some embodiments, the base station is configured to avoid deploying the packet-switched voice communication on unlicensed bands based on the information. In some embodiments, the base station is configured to deploy the voice communication using frequency division duplexing and not using time division duplexing based on the information. In some embodiments, the base station is configured to implement a Policy and Charging Enforcement Function (PCEF) and receive the information from a policy and charging rules function (PCRF) unit, where the information utilizes the PCEF implemented by the base station.

In some embodiments, an MME device is configured to perform any action or combination of actions as substantially described herein. In some embodiments, a PGW device is configured to perform any action or combination of actions as substantially described herein. In some embodiments, a PCRF device is configured to perform any action or combination of actions as substantially described herein. In some embodiments, a PCSCF device is configured to perform any action or combination of actions as substantially described herein. In some embodiments, a wireless device that includes any component or combination of components is configured to perform any action or combination of actions as substantially described herein. In some embodiments, an integrated circuit is configured to perform any action or combination of actions as substantially described herein. In some embodiments, a non-transitory computer-readable medium stores instructions that, when executed, cause the performance of any action or combination of actions as substantially described herein. In some embodiments, a method may include any action or combination of actions as substantially described herein.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   receiving, by a base station prior to establishment of a dedicated bearer for IP multimedia subsystem (IMS) signaling for a user equipment (UE) device, first information from the UE device in a radio resource control (RRC) connection request message, wherein the first information indicates that the UE is requesting at least one of voice or video communication over a packet-switched network; and
   initiating, by the base station in response to the first information, configuration of a dedicated bearer for IMS signaling for the UE device, wherein the configuration is based on the first information; and
   using, by the base station, the dedicated bearer for IMS signaling and a dedicated IMS voice or video data bearer for the voice or video communication.

2. The method of claim 1, wherein the RRC connection request message is received in conjunction with a SIP invite to a Proxy Call Session Control Function (PCSCF) unit.

3. The method of claim 1, wherein the RRC connection request message is received after establishment of a default bearer for the UE device.

4. An apparatus, comprising:
   one or more processors;
   one or more memories storing program instructions that are executable to cause the apparatus to perform operations comprising:
     receiving, prior to establishment of a dedicated bearer for IP multimedia subsystem (IMS) signaling for a user equipment (UE) device, first information from the UE device in a radio resource control (RRC) connection request message, wherein the first information indicates that the UE is requesting at least one of voice or video communication over a packet-switched network; and
     initiating, in response to the first information, configuration of a dedicated bearer for IMS signaling for the UE device, wherein the configuration is based on the first information; and
     use the dedicated bearer for IMS signaling and a dedicated IMS voice or video data bearer for the voice or video communication.

5. The apparatus of claim 4, wherein the RRC connection request message is received in conjunction with a SIP invite to a Proxy Call Session Control Function (PCSCF) unit.

6. The apparatus of claim 4, wherein the RRC connection request message is received after establishment of a default bearer for the UE device.

7. An apparatus, comprising:
one or more memories; and
one or more processors configured to execute instructions stored on the one or more memories to:
transmit, to a base station prior to establishment of a dedicated bearer for IP multimedia subsystem (IMS) signaling for the apparatus, first information in a radio resource control (RRC) connection request message, wherein the first information indicates that the apparatus is requesting at least one of voice or video communication over a packet-switched network;
wherein the first information operates to configure a dedicated bearer for IMS signaling for the apparatus, wherein the configuration is based on the first information; and
using the dedicated bearer for IMS signaling and a dedicated IMS voice or video data bearer for the voice or video communication.

8. The apparatus of claim 7, wherein the apparatus is configured to transmit the RRC connection request message is received in conjunction with a SIP invite to a Proxy Call Session Control Function (PCSCF) unit.

9. The apparatus of claim 7, wherein the RRC connection request message is transmitted after establishment of a default bearer for the apparatus.

10. A non-transitory computer-readable medium having instructions stored thereon that are executable by a UE device to perform operations comprising:
transmitting, to a base station prior to establishment of a dedicated bearer for IP multimedia subsystem (IMS) signaling for the UE device, first information in a radio resource control (RRC) connection request message, wherein the first information indicates that the UE device is requesting at least one of voice or video communication over a packet-switched network;
wherein the first information operates to configure a dedicated bearer for IMS signaling for the UE device, wherein the configuration is based on the first information; and
using the dedicated bearer for IMS signaling and a dedicated IMS voice or video data bearer for the voice or video communication.

11. The non-transitory computer-readable medium of claim 10, wherein the UE device is configured to transmit the RRC connection request message is received in conjunction with a SIP invite to a Proxy Call Session Control Function (PCSCF) unit.

12. The non-transitory computer-readable medium of claim 10, wherein the RRC connection request message is transmitted after establishment of a default bearer for the UE device.

* * * * *